May 30, 1944. J. KRAL 2,350,315
FASTENER
Filed Dec. 27, 1941

Inventor:
Joseph Kral.
by John Todd
Att'y.

Patented May 30, 1944

2,350,315

UNITED STATES PATENT OFFICE 2,350,315

FASTENER

Joseph Kral, Cambridge, Mass., assignor to United-Carr Fastener Corporation, Cambridge, Mass., a corporation of Massachusetts Application December 27, 1941, Serial No. 424,605

6 Claims. (Cl. 85—36)

This invention relates to improvements in fastener members and fastener installations and particularly to those installations in which a part to be supported is secured to a supporting panel by means of fastener members of improved construction.

The broad object of my invention is directed to an installation having a part to be supported, which is preferably of plastic material, providing stud or shank elements extending through openings of a supporting panel, and fastener members in gripping engagement with the stud elements on the other side of the supporting panel from the part to be supported to secure the supported part in firm abutting relation to the panel.

Other objects and uses of my invention will be apparent from inspection of the drawing and specification hereinbelow set forth.

Referring to the drawing in which I have illustrated a preferred embodiment of my invention:

Figure 1:
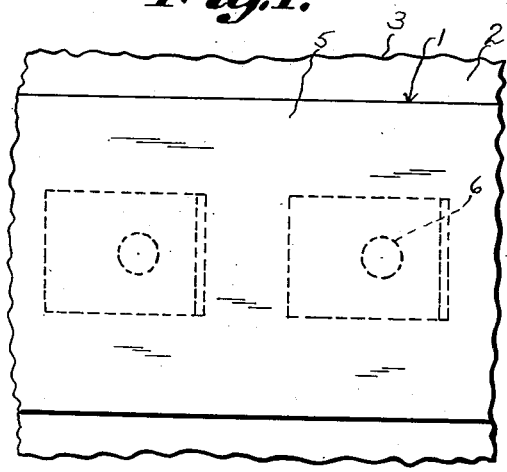
Fig. 1 is a top plan view of an installation embodying my invention.
Figure 2:
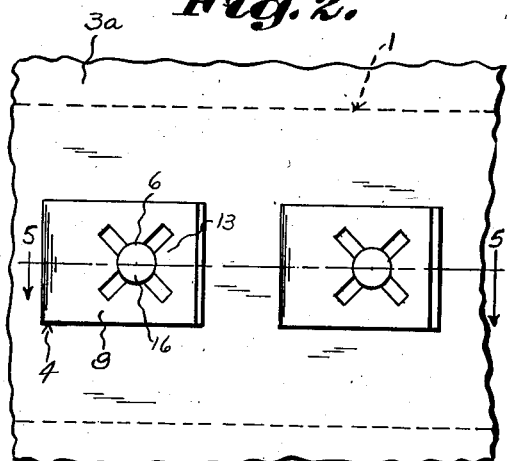
Fig. 2 is a bottom plan view of the installation shown in Fig. 1.
Figure 3:
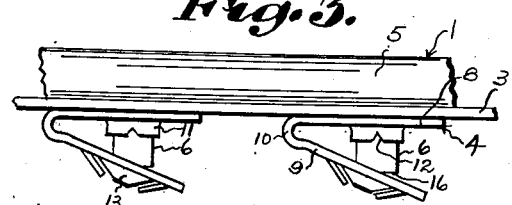
Fig. 3 is a side elevation showing the fastener members in initial assembly with the stud elements of the part to be supported.
Figure 4:
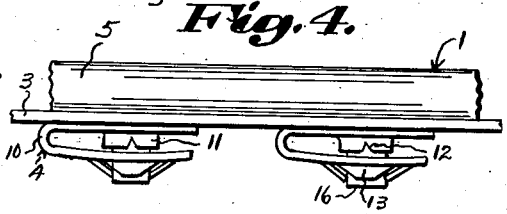
Fig. 4 is a view similar to Fig. 3, showing the construction of the fastener members when the same are in final fastened engagement with the stud elements.
Figure 5:
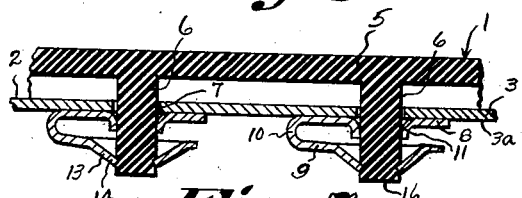
Fig. 5 is a section taken along the line 5—5 of Fig. 2.

Referring to Figs. 1–5 of the drawing, I have shown a preferred fastener installation in which a part to be supported, such as an ornamental strip 1, is secured in abutment to the exterior surface 2 of a relatively thin supporting panel 3 by means of one or more of my improved fastener members 4. The part to be supported 1 is preferably of plastic material, such as Bakelite, Tenite, Catalin, and the like, and may be an ornamental strip of the type now used to trim automobile dash panels and the like. The ornamental member 1 comprises a body or strip 5 adapted to be disposed on the exterior surface of the panel 3 and a series of studs 6 integrally molded with the body 5 and projecting outwardly therefrom. The studs 6, in my preferred installation, are circular in cross section and have a smooth outer surface. The studs extend through openings 7 of the supporting panel (Fig. 5) and substantially beyond the rear surface 3ᵃ of the panel 3. The fastener members 4 are engaged with the studs 6 from a position opposite the rear surface of the panel and are constructed in a way to cooperate with the stud and panel to draw the body 5 of the ornamental member tightly against the exterior surface 2 of the panel 3 to effect a non-rattle assembly.

Although my fastener is constructed particularly for cooperation with studs of plastic material, it is understood that I do not wish to limit my invention exclusively to my preferred use, as the fastener is also capable of efficient operation with other materials such as, for example, wood and metal to effect a secure fastening.

Figure 6:
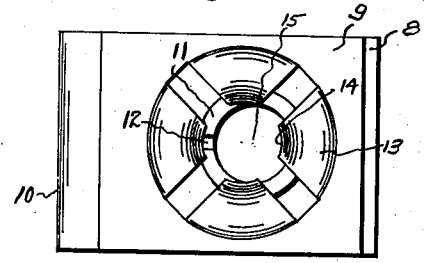
Fig. 6 is an enlarged bottom view of my improved fastener member per se.
Figure 7:
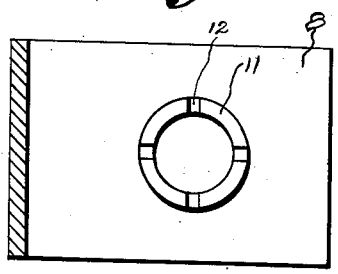
Fig. 7 is a view similar to Fig. 6, but with the lower arm of the fastener member cut away to show the construction of the upper arm.
Figure 8:
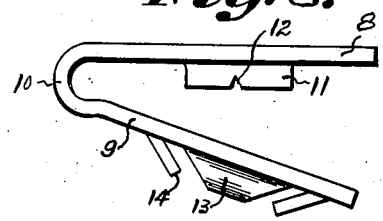
Fig. 8 is a side elevation of the fastener shown in Figs. 6 and 7.

Referring in detail to my preferred fastener member illustrated in the drawing, I have shown one made entirely from one piece of spring steel. The fastener member 4 comprises an inner arm 8 and an outer arm 9, viewing Fig. 8, joined at one end of the fastener by a bight 10. The arms 8 and 9 normally diverge from the bight 10 so as to form an acute angle and the arm 9 is movable toward the arm 8 under tension set up by the bight 10. The inner arm 8 has a stud receiving opening in the form of a cylindrical bearing or sleeve element 11, which is pressed from the arm 8 so as to project in the direction of the arm 9. The bearing element 11 is open at both ends to allow the stud to pass entirely therethrough. The inside diameter of the bearing element at the lower end thereof is normally less than the diameter of the stud element, and slots 12 are provided in the wall thereof adjacent its lower end dividing the wall of the bearing element into a number of yieldable segments which grip the stud 6 for a purpose to be described. The outer arm 9 has an annular series of tongues 13 pressed out of the normal plane thereof and providing free end elements 14 spaced one from another so as to define a stud-receiving opening 15 (Fig. 6). The stud-receiving opening 15 is of slightly smaller diameter than that of the stud element 6, whereby the tongues 13 are expanded by entrance of the stud element through the opening 15 causing the end elements 14 to engage with the stud.

In assembling the parts of the installation, the stud elements 6 are moved through the respective openings 7 to dispose the body 5 of the ornamental member in abutting relation with the outer surface 2 of the panel 3. Next, the bearings 11 of the respective fastener members are forced over the stud ends to dispose the inner arm 8 of the fastener in abutting relation to the outer surface 3ª of the panel 3. During this action, the wall of the bearing 11, which is made yieldable as a result of the slots 12, is expanded by the stud and grips the stud to hold the fastener in initial assembly with the stud. It will be seen from inspection of Fig. 3 that when the fastener members are in initial assembled position, the outer arms 9 are disposed beneath the outermost end 16 of the stud with the opening 15 in substantial alignment with the stud. Finally, the arm 9 of each fastener is moved toward the arm 8 by a suitable tool to project the end 16 of the respective stud through the aperture 15. The arm 9 of each fastener may be forced in the direction of the arm 8 until the arm 9 is positioned in substantially parallel relation to the arm 8, as most clearly shown in Fig. 4. During this action the yieldable tongues 13 are expanded by the stud causing the free ends 14 to bite into the stud element in the effort of the tongue elements to return to normal position, thereby preventing relative movement between the arm 9 and the stud. At the same time, the tension set up by the bight 10 tends to urge the arm 9 away from the arm 8, thereby pulling the body 5 of the ornamental part firmly against the supporting panel.

It is understood that my improved fastener member could be secured to the stud element in one complete action so as to secure the ornamental part to the support, but manufacturers have found it more desirable in installations wherein a long strip is provided having a number of stud elements to secure the fastener members in temporary assembly with the stud elements and, thereafter, in another operation close the arms 9 of the fasteners over the studs in the manner above set out to complete the fastening operation. It is for this reason that my preferred fastener members provide the yieldable bearing 11 by which the fastener engages the stud so as to be held thereon until it is desired to make the fastening final.

Although I have illustrated and described a preferred embodiment of my invention, I do not wish to be limited thereby because the scope of my invention is best defined by the following claims.

I claim:

1. A fastener for clamping together an apertured member and a second member having a stud passed through the aperture of the first named member, said fastener being formed of spring material and having inner and outer arms normally disposed in divergent untensioned relation, each of said arms being formed with a stud receiving opening which are normally in non-registering alignment, stud gripping means associated with the outer fastener arm, said fastener being compressible by movement of the arms thereof toward a substantially parallel relation with the stud receiving openings in registering alignment whereby both arms of said fastener may be passed over the stud to enable said tongues to grip said stud when the fastener is released.

2. A fastener for clamping together an apertured member and a second member having a stud passed through the aperture of the first named member, said fastener being formed of spring material and having inner and outer arms normally disposed in divergent untensioned relation, each of said arms being formed with a stud receiving opening which are normally in non-registering alignment, a plurality of stud gripping tongues on said outer arm surrounding said opening thereof, said fastener being compressible by movement of the arms thereof toward a substantially parallel relation with the stud receiving openings in registering alignment whereby both arms of said fastneer may be passed over the stud to enable said tongues to grip said stud when the fastener is released.

3. A fastener for clamping together an apertured member and a second member having a stud passed through the aperture of the first named member, said fastener being formed of spring material and having inner and outer arms normally disposed in divergent untensioned relation, an outwardly extending tubular bearing on said inner arm providing a stud receiving bearing opening therein, a plurality of stud gripping tongues struck from the outer arm, the free end edges of said tongues defining a stud receiving opening for said outer arm which is normally in non-registering relation with said bearing opening, said fastener being compressible by movement of the arms thereof toward a substantially parallel relation with the stud receiving openings in registering alignment whereby both arms of said fastener may be passed over the stud to enable said tongues to grip said stud when the fastener is released.

4. A fastener for clamping together an apertured member and a second member having a stud passed through the aperture of the first named member, said fastener being formed of spring material and having inner and outer arms normally disposed in divergent untensioned relation, an outwardly extending tubular bearing on said inner arm providing a stud receiving bearing opening therein, a plurality of yieldable and expandable stud gripping tongues struck from the outer arm, the free end edges of said tongues defining a stud receiving opening for said arm which is normally in non-registering relation with said bearing opening, said fastener being compressible to a position with the arms thereof in substantial parallel relation with the stud receiving openings in registering alignment whereby both arms of said fastener may be passed over the stud to enable said tongues to grip said stud when the fastener is released.

5. A fastener for clamping together an apertured member and a second member having a stud passed through the aperture of the first named member, said fastener being formed of spring material and having inner and outer arms normally disposed in divergent untensioned relation, an outwardly extending tubular bearing on said inner arm providing a stud receiving bearing opening therein, said bearing having a slot in the walls thereof providing yieldable elements frictionally engaging said stud to hold said fastener in initial assembly therewith, a plurality of yieldable and expandable stud gripping tongues struck from the outer arm, the free end edges of said tongues defining a stud receiving opening for said outer arm of slightly less diameter than the diameter of said stud and which is normally in non-registering relation with said bearing opening, said fastener being compressible by movement of the arms thereof toward substantially parallel relation to place the stud receiving openings in registering alignment whereby both arms of said fastener may be passed over the stud to enable said tongue to grip said stud when the fastener is released under forces tending to urge said arms toward normal divergent relation thereby to secure said first and second members in tensioned fastened assembly.

6. A fastener for securing a plurality of members in tensioned clamped engagement, one of said members being apertured and the other member having a stud extending through the aperture of said first named member, said fastener being formed of a single piece of spring material having normally divergent inner and outer arms, each having a stud receiving aperture normally out of registering alignment, stud gripping means associated with the outer arm and surrounding the stud receiving opening thereof said fastener being compressible by movement of the arms thereof toward a parallel relation to a position when the stud receiving openings of both arms may be passed over the stud so that said inner arm of said fastener will bear against the outer face of said apertured member and said outer arm grip said stud member under tension to thereby maintain said members in tensioned clamping engagement, said fastening means being assembled in the installation subsequent to the assembly of the stud carrying member with the apertured member.

JOSEPH KRAL.